United States Patent [19]
Abraham et al.

[11] 3,812,414
[45] May 21, 1974

[54] STEPPER MOTOR CONTROL SYSTEM USING PULSE INJECTION FOR VELOCITY OVERSHOOT CONTROL

[75] Inventors: Dennis G. Abraham, Vestal; Ray A. McSparran, Endicott, both of N.Y.

[73] Assignee: International Business Machines Corporation, Armonk, N.Y.

[22] Filed: Nov. 24, 1972

[21] Appl. No.: 309,297

[52] U.S. Cl................. 318/696, 318/415, 318/685
[51] Int. Cl. .......................................... H02k 37/00
[58] Field of Search.................. 313/415, 686, 685

[56] References Cited
UNITED STATES PATENTS

| 3,732,480 | 5/1973 | Hendrickson et al............... 318/696 |
| 3,573,592 | 4/1971 | Agin ..................... 318/696 |
| 3,345,547 | 10/1967 | Dunne ................... 318/696 |
| 3,112,433 | 11/1963 | Fairbanks ................ 318/696 |
| 3,475,667 | 10/1969 | Newell.................... 318/696 |

*Primary Examiner*—G. R. Simmons
*Attorney, Agent, or Firm*—Gerald R. Gugger

[57] ABSTRACT

Starting control of a stepper motor having an open-loop oscillator control is obtained by utilizing a pulse injection arrangement whereby a plurality of pulses are supplied in rapid succession at the proper time to the drive circuits for the stepper motor giving a negative torque to the motor which prevents an overshoot in velocity.

5 Claims, 2 Drawing Figures

3,812,414

STEPPER MOTOR CONTROL SYSTEM USING PULSE INJECTION FOR VELOCITY OVERSHOOT CONTROL

BACKGROUND OF THE INVENTION

With the exception of an open-loop bang-bang control system, historically, the open-loop oscillator control has been by far the most economical to realize for a practical stepper motor application. The open-loop oscillator control enjoys simplicity of design and implementation while it suffers from a minimum control of the motor. During stepper motor start-up at a fixed oscillator frequency, the rotor will hunt around the final velocity until it settles into its steady state value. In some applications, this may not be a problem since sufficient time may be allowed for the motor to settle into its steady state value which usually takes several hundred milliseconds.

In the majority of applications, this start-up transient is undesirable and various attempts have been made to lessen or eliminate it, all with limited success. The most common approach is to use a ramped oscillator. This allows the frequency to be brought up slowly or optimally to the correct steady state value. While this method of control is very successful for stepping rates above the step to step region, it does nothing but aggravate the situation in the step to step region since the motor will be at full speed within one step.

SUMMARY OF THE INVENTION

The control system of the present invention allows a new class of motor operation to accomplish start and stop within the step to step region with no overshoot. The key to the control is to get the rotor and field into synchronization as soon as possible after startup by "juggling" the field control. The control is accomplished by pulse injection wherein a plurality of single-shots are fired to give a series of pulses to the motor drive triggers. Advancing the drive triggers three positions gives a negative torque to a four phase motor which prevents the overshoot in velocity. It was found that the pulse injection method worked very well and was practical to implement It is, then, a primary object of the present invention to provide a control system to prevent overshoot in velocity during starting of a stepper motor in open-loop mode.

A further object of the present invention is to provide a control system which utilizes pulse injection to prevent overshoot in velocity during starting of a stepper motor in open-loop mode.

A still further object of the present invention is to provide an open-loop oscillator control system for a stepper motor which includes pulse injection means to give a negative torque to the motor to prevent an overshoot in velocity during starting of the motor.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
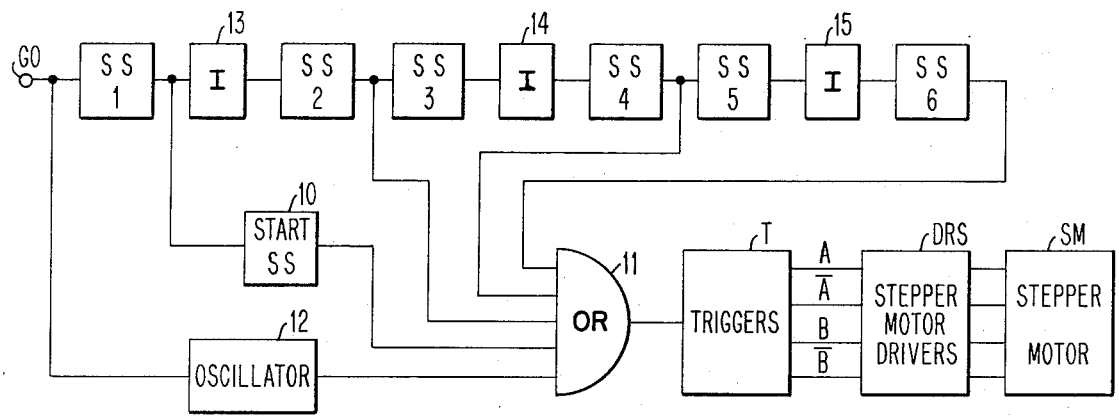
FIG. 1 is a diagrammatic illustration of the stepper motor control system of the present invention.
Figure 2:
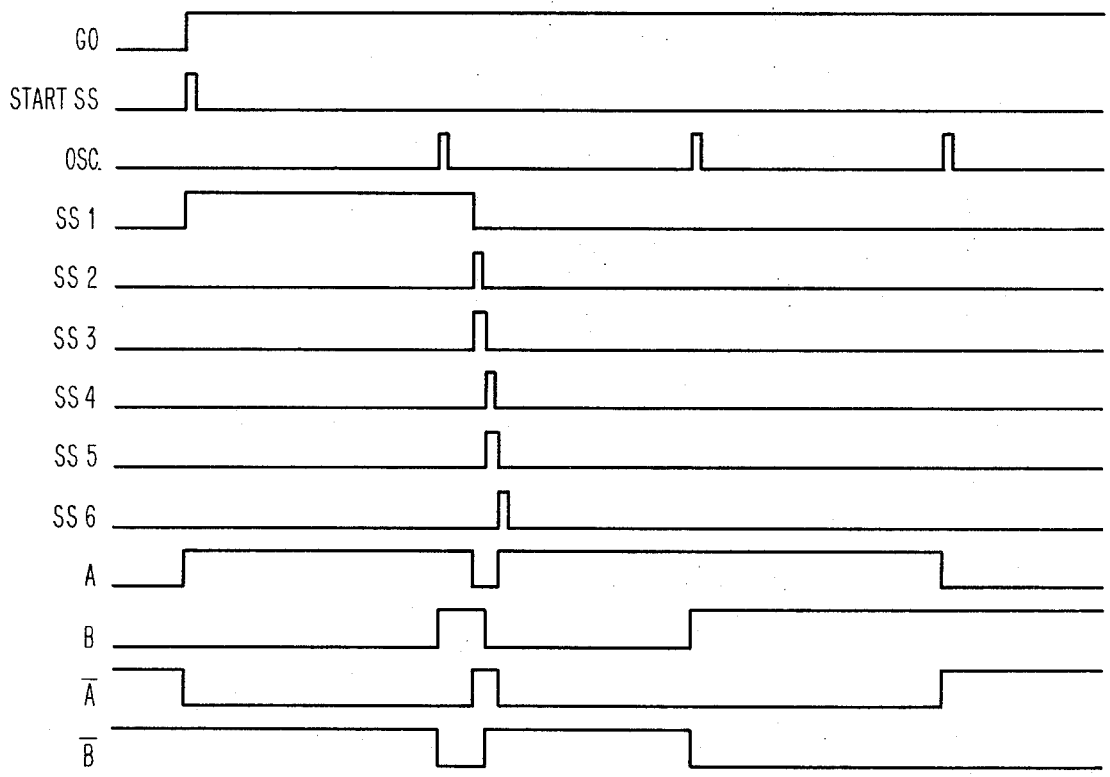
FIG. 2 is a diagrammatic waveform illustration showing the manner of operation of the control system of FIG. 1.

Referring to FIG. 1, there is shown in schematic form the stepper motor control circuit of the present invention and, as may be found in known stepper motor control circuits, the system includes a plurality of driver circuits DRS arranged to supply pulses of energy of sufficient magnitude and proper phase relationship to the windings of a conventional stepper motor SM under the control of the outputs of a trigger arrangement T. The trigger arrangement includes a pair of cross-connected triggers, not shown, and generally designated as TRA and TRB, which operate to supply sequences of output pulses, four in number, the sequence of the pulses determining the direction of operation of the stepper motor.

All of the foregoing apparatus and arrangement is conventional and well known in the art, and it is deemed unnecessary to describe the apparatus in any further detail for this particular portion of the circuitry.

In operation, when the positive Go signal is initiated, a single-shot No. 1 is set ON and it delivers a positive pulse to set ON a start single-shot 10. The positive output pulse from the start single-shot is delivered to conventional OR circuitry 11, the triggers T, and the driver circuits DRS to give the first field change to the stepper motor SM. An oscillator 12 is also started by Go signal and it produces positive output pulses to continue to drive the motor.

When single shot No. 1 times out, the negative transient is passed to an inverter 13 which in turn sets ON a single-shot No. 2. The positive output pulse from single-shot No. 2 is the first of a series of three injection pulses which are transmitted to the drive triggers T. This output pulse also sets ON a single-shot No. 3 and when the positive output pulse from single-shot No. 3 times out, the negative transient is passed to an inverter 14 which in turn sets ON a single-shot No. 4. The positive output pulse from single-shot No. 4 is the second injection pulse transmitted to the drive triggers T and it also sets ON a single-shot No. 5. The negative transient when single-shot No. 5 times out is passed through an inverter 15 to set ON a single-shot No. 6 and the positive output pulse from single-shot No. 6 is the third injection pulse to the drive triggers.

The series of three pulses to the drive triggers advances the drive triggers three positions giving a negative torque to the motor which prevents the overshoot in velocity. Single-shots No. 3 and No. 5 are set short so that the interval between the three pulses is only a few microseconds. This will cause the drive triggers to advance but will be too short for the stepper motor to respond to each individual pulse.

From the foregoing, it will be apparent that the present invention provides a novel method for controlling an open-loop oscillator driven stepper motor by utilizing a pulse injection method for allowing start and stop of the motor within the step to step region with no overshoot.

While the invention has been particularly shown and described with reference to a preferred embodiment thereof, it will be understood by those skilled in the art that various changes in form and details may be made therein without departing from the spirit and scope of the invention.

What is claimed is:

1. A stepper motor control system of the open-loop type comprising, in combination:
   driver circuit means for a stepper motor;
   drive triggers for supplying sequences of motor control output pulses for energizing said driver circuit means;
   signal means for supplying a pulse to said drive triggers to start said stepper motor;
   an oscillator started by said signal means for supplying pulses to said drive triggers to drive said stepper motor; and
   pulse injection means rendered operative by said signal means when said stepper motor is started for supplying a series of pulses to advance said drive triggers whereby a negative torque is applied to the stepper motor to prevent an overshoot in velocity during starting of said motor within the step to step region.

2. A stepper motor control system of the open-loop type comprising, in combination:
   driver circuit means for a stepper motor;
   driver triggers for supplying sequences of motor control output pulses for energizing said driver circuit means;
   signal means for supplying a pulse to said drive triggers to start said stepper motor;
   an oscillator started by said signal means for supplying pulses to said drive triggers to drive said stepper motor; and
   a series of interconnecteed single-shot devices rendered operative by said signal means when said stepper motor is started for supplying a series of pulses to advance said drive triggers whereby a negative torque is applied to the stepper motor to prevent an overshoot in velocity during starting of said motor within the step to step region.

3. A stepper motor control system of the open-loop type comprising, in combination:
   driver circuit means for a stepper motor;
   drive triggers for supplying sequences of motor control output pulses for energizing said driver circuit means;
   signal means for supplying a pulse to said drive triggers to start said stepper motor;
   an oscillator started by said signal means for supplying pulses to said drive triggers to drive said stepper motor; and
   a series of interconnected singleshot devices rendered operative by said signal means when said stepper motor is started for supplying a series of pulses having a short interval therebetween which will cause the drive triggers to advance but will be too short for the stepper motor to respond to each individual pulse whereby an overshoot in velocity is prevented during starting of said motor within the step to step region.

4. A stepper motor control system as in claim 1 wherein said series of pulses from the pulse injection means occur at a substantially higher frequency than the frequency of said oscillator pulses.

5. A stepper motor control system as in claim 3 wherein said series of pulses comprises three pulses having an interval therebetween in the range of a few microseconds.

* * * * *